United States Patent
Tomlin

(10) Patent No.: US 11,321,020 B2
(45) Date of Patent: May 3, 2022

(54) SYSTEM AND METHOD FOR MULTICHIP COHERENCE WITH SIDE-BY-SIDE PARALLEL MULTIPORT OPERATION

(71) Applicant: Kioxia Corporation, Tokyo (JP)

(72) Inventor: Andrew John Tomlin, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 54 days.

(21) Appl. No.: 17/026,055

(22) Filed: Sep. 18, 2020

(65) Prior Publication Data
US 2022/0091783 A1    Mar. 24, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0653* (2013.01); *G06F 3/0658* (2013.01); *G06F 3/0683* (2013.01)

(58) Field of Classification Search
CPC .... G06F 3/0659; G06F 3/0604; G06F 3/0611; G06F 3/0653; G06F 3/0658; G06F 3/0683
See application file for complete search history.

(56) References Cited

U.S. PATENT DOCUMENTS

| | | | | |
|---|---|---|---|---|
| 4,920,485 A * | 4/1990 | Vahidsafa | ............. | G06F 9/3879 710/242 |
| 6,393,535 B1 * | 5/2002 | Burton | ................. | G06F 3/0613 711/154 |
| 6,654,831 B1 * | 11/2003 | Otterness | ............. | G06F 3/0613 710/74 |
| 7,330,999 B2 * | 2/2008 | Davies | ................ | G06F 11/1464 714/5.11 |
| 7,343,457 B1 * | 3/2008 | End, III | ............. | G06F 13/1605 709/213 |
| 7,395,379 B2 * | 7/2008 | Glasco | ................ | G06F 12/0817 711/141 |
| 7,643,334 B1 * | 1/2010 | Lee | .................... | G11C 13/0069 365/163 |
| 7,805,587 B1 * | 9/2010 | Van Dyke | ............... | G06F 12/10 711/202 |
| 8,230,202 B2 * | 7/2012 | Berg | ................... | G06F 11/3636 712/227 |

(Continued)

OTHER PUBLICATIONS

Jones, D, Kalka Jr. R, Methodology for Serializing Asynchronous Network Requests Over Multiple Paths, IBM Technical Disclosure Bulletin, Jan. 1, 1993. (Year: 1993).*

*Primary Examiner* — Khoa D Doan

(74) *Attorney, Agent, or Firm* — Foley & Lardner LLP

(57) ABSTRACT

A method for maintaining coherence for memory storage devices comprising a plurality of controllers in a side-by-side configuration. The method includes generating, by a first controller of the plurality of controllers, a first plurality of requests to access a first plurality of memory ranges; receiving, by the first controller from a second controller of the plurality of controllers, a second plurality of requests to access a second plurality of memory ranges; and serializing, by the first controller, the first plurality of requests and the second plurality of requests to generate a serialized request.

24 Claims, 8 Drawing Sheets

(56) References Cited

U.S. PATENT DOCUMENTS

| | | | |
|---|---|---|---|
| 8,566,515 B2* | 10/2013 | Rubinstein | H04N 19/91 |
| | | | 711/104 |
| 10,027,600 B2* | 7/2018 | Kruecker | H04L 49/103 |
| 10,042,785 B1* | 8/2018 | Buch | G06F 3/0674 |
| 10,198,205 B1* | 2/2019 | Freilich | G06F 3/0688 |
| 10,474,363 B1* | 11/2019 | Cui | G06F 3/0653 |
| 2006/0010341 A1* | 1/2006 | Kodama | G06F 3/0662 |
| | | | 714/6.31 |
| 2006/0095646 A1* | 5/2006 | Gower | G06F 13/1684 |
| | | | 711/100 |
| 2013/0083689 A1* | 4/2013 | Mercier | H04W 8/005 |
| | | | 370/254 |
| 2013/0159603 A1* | 6/2013 | Whitney | G06F 11/1461 |
| | | | 711/103 |
| 2014/0136799 A1* | 5/2014 | Fortin | G06F 12/0837 |
| | | | 711/152 |
| 2015/0134880 A1* | 5/2015 | Danilak | G06F 3/0688 |
| | | | 711/103 |
| 2016/0077752 A1* | 3/2016 | Vanninen | G06F 3/061 |
| | | | 711/114 |
| 2017/0046268 A1* | 2/2017 | Ummadi | G06F 12/0238 |
| 2017/0103030 A1* | 4/2017 | Luo | G06F 13/1694 |
| 2017/0242812 A1* | 8/2017 | Cobley | G06F 13/36 |
| 2017/0337246 A1* | 11/2017 | Chang | G06F 16/254 |
| 2018/0157609 A1* | 6/2018 | Kong | G06F 13/4282 |
| 2018/0314666 A1* | 11/2018 | Tanaka | G06F 13/1668 |
| 2019/0377493 A1* | 12/2019 | Hallnor | G06F 3/0604 |
| 2021/0103387 A1* | 4/2021 | Vanninen | G06F 3/0611 |
| 2021/0248451 A1* | 8/2021 | Rajamani | G06N 3/04 |
| 2021/0311658 A1* | 10/2021 | Farmahini | G06F 13/24 |

* cited by examiner

SYSTEM AND METHOD FOR MULTICHIP COHERENCE WITH SIDE-BY-SIDE PARALLEL MULTIPORT OPERATION

TECHNICAL FIELD

The disclosure relates generally to NAND memory and, more particularly, to systems and methods for multichip coherence with side-by-side parallel multiport operation.

BACKGROUND

A solid-state drive (SSD) includes several non-volatile memory devices such as but not limited to, NAND flash memory devices controlled by a controller such that the NAND flash memory devices behave like a single drive. The NAND flash memory devices are subject to host originated I/O operations such as reading and writing data stored in the NAND flash memory devices, which may originate from multiple disparate applications running on one or more hosts. A NAND flash memory device may be composed of multiple die but a single die may only be processing a single I/O operation at any one time and a memory bus/channel connecting multiple NAND flash devices to a memory controller may only be transferring data for a single memory device at any one time. In SSDs where the NAND flash devices controlled by more than one controller, each controller may be performing data accesses to different memory devices at any one time, but difficulties exist in maintaining data coherence between the accesses and avoiding a so-called 'deadly embrace' when the accesses overlap in address range.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, the present disclosure is directed to a method for maintaining coherence for memory storage devices comprising a plurality of controllers in a side-by-side configuration. In some embodiments, the method includes generating, by a first controller (e.g., controller 202a in FIG. 2) of the plurality of controllers, a first plurality of requests to access a first plurality of memory ranges (e.g., memory ranges of non-volatile memory device 340 in FIG. 3B). In some embodiments, the method includes receiving, by the first controller from a second controller (e.g., controller 202b in FIG. 2) of the plurality of controllers, a second plurality of requests to access a second plurality of memory ranges (e.g., memory ranges of non-volatile memory device 350 in FIG. 3B). In some embodiments, the method includes serializing, by the first controller, the first plurality of requests and the second plurality of requests to generate a serialized request.

In some embodiments, the method includes determining, by the first controller, a synchronization between the first controller and the second controller. In some embodiments, the method includes sending, by the first controller, the serialized request to a back-end component of the first controller and to a back-end component of the second controller. In some embodiments, the serialized request causes the back-end component of the first controller to process the serialized request responsive to receiving the serialized request, wherein the serialized request causes the back-end component of the second controller to process the serialized request responsive to receiving the serialized request.

In some embodiments, the first plurality of requests are associated with a plurality of generation times that are each indicative of when the first controller generated a respective request of the first plurality of requests, wherein the second plurality of requests are associated with a plurality of receiving times that are each indicative of when the first controller received a respective request of the second plurality of requests from the second controller, and/or the method includes interleaving, by the first controller, the first plurality of requests and the second plurality of requests according to the at least one of the plurality of receiving times or the plurality of generation times.

In some embodiments, a first memory range of the first plurality of memory ranges is associated with a non-volatile memory of the second controller. In some embodiments, a second memory range of the second plurality of memory ranges corresponds to the first memory range of the first plurality of memory ranges. In some embodiments, the method includes preventing, by the first controller and prior to generating the serialized request, a back-end component of the first controller from processing the first plurality of requests. In some embodiments, the second plurality of requests to access a second plurality of memory ranges includes a plurality of command end controls. In some embodiments, each request of the first plurality of requests corresponds to a first plurality of operations; and/or each request of the second plurality of requests corresponds to a second plurality of operations.

In some embodiments serializing the first plurality of requests and the second plurality of requests includes extracting, by the first controller, a beginning operation from each of the first plurality of operations to generate a plurality of beginning operations associated with the first plurality of operations; extracting, by the first controller, a beginning operation from each of the second plurality of operations to generate a plurality of beginning operations associated with the second plurality of operations; and/or serializing, by the first controller, the plurality of beginning operations associated with the first plurality of operations and the plurality of beginning operations associated with the second plurality of operations to generate the serialized request. In some embodiments, the method includes allowing, by the first controller, the second controller to process the other operations of the second plurality of operations without sending a request to the first controller.

In another one aspect, the present disclosure is directed to a memory storage device comprising a first controller and a second controller in a side-by-side and/or a memory. The first controller comprising a back-end component and/or a front-end component. The front-end component is configured to generate a first plurality of requests to access a first plurality of memory ranges of the memory; receive, from the second controller, a second plurality of requests to access a second plurality of memory ranges of the memory; and/or serialize the first plurality of requests and the second plurality of requests to generate a serialized request.

In some embodiments, the front-end component is further configured to determine a synchronization between the first controller and the second controller. In some embodiments, the front-end component is further configured to send the serialized request to the back-end component of the first controller; and/or send the serialized request to a back-end component of the second controller.

In some embodiments, the first plurality of requests are associated with a plurality of generation times that are each indicative of when the first controller generated a respective request of the first plurality of requests, the second plurality of requests are associated with a plurality of receiving times that are each indicative of when the first controller received a respective request of the second plurality of requests from the second controller, and/or the front-end component is further configured to interleave the first plurality of requests and the second plurality of requests according to the at least one of the plurality of receiving times or the plurality of generation times.

In some embodiments, a first memory range of the first plurality of memory ranges is associated with a non-volatile memory of the second controller. In some embodiments, a second memory range of the second plurality of memory ranges corresponds to the first memory range of the first plurality of memory ranges. In some embodiments, the front-end component is further configured to prevent, prior to generating the serialized request, the back-end component of the first controller from processing the first plurality of requests.

In some embodiments, the second plurality of requests to access a second plurality of memory ranges includes a plurality of command end controls. In some embodiments, each request of the first plurality of requests corresponds to a first plurality of operations; and/or each request of the second plurality of requests corresponds to a second plurality of operations. In some embodiments, the front-end component is further configured to extract a beginning operation from each of the first plurality of operations to generate a plurality of beginning operations associated with the first plurality of operations; extract a beginning operation from each of the second plurality of operations to generate a plurality of beginning operations associated with the second plurality of operations; and/or serialize the plurality of beginning operations associated with the first plurality of operations and the plurality of beginning operations associated with the second plurality of operations to generate the serialized request. In some embodiments, the front-end component if further configured to allow the second controller to process the other operations of the second plurality of operations without sending a request to the first controller.

In another aspect, the present disclosure is directed to a method for maintaining coherence for memory storage devices comprising a plurality of controllers in a side-by-side configuration. In some embodiments, the method includes sending, by a first controller of the plurality of controllers to a second controller of the plurality of controllers, a configuration message that causes the second controller to enter a configuration mode; sending, by the first controller to a front-end component of the first controller, a command message that causes the front-end component to generate a first plurality of requests to access a first plurality of memory ranges; receiving, by the first controller from the second controller, a second plurality of requests to access a second plurality of memory ranges; and/or sending, by the first controller to the front-end component, a second command message that causes the front-end component to serialize the first plurality of requests and the second plurality of requests.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
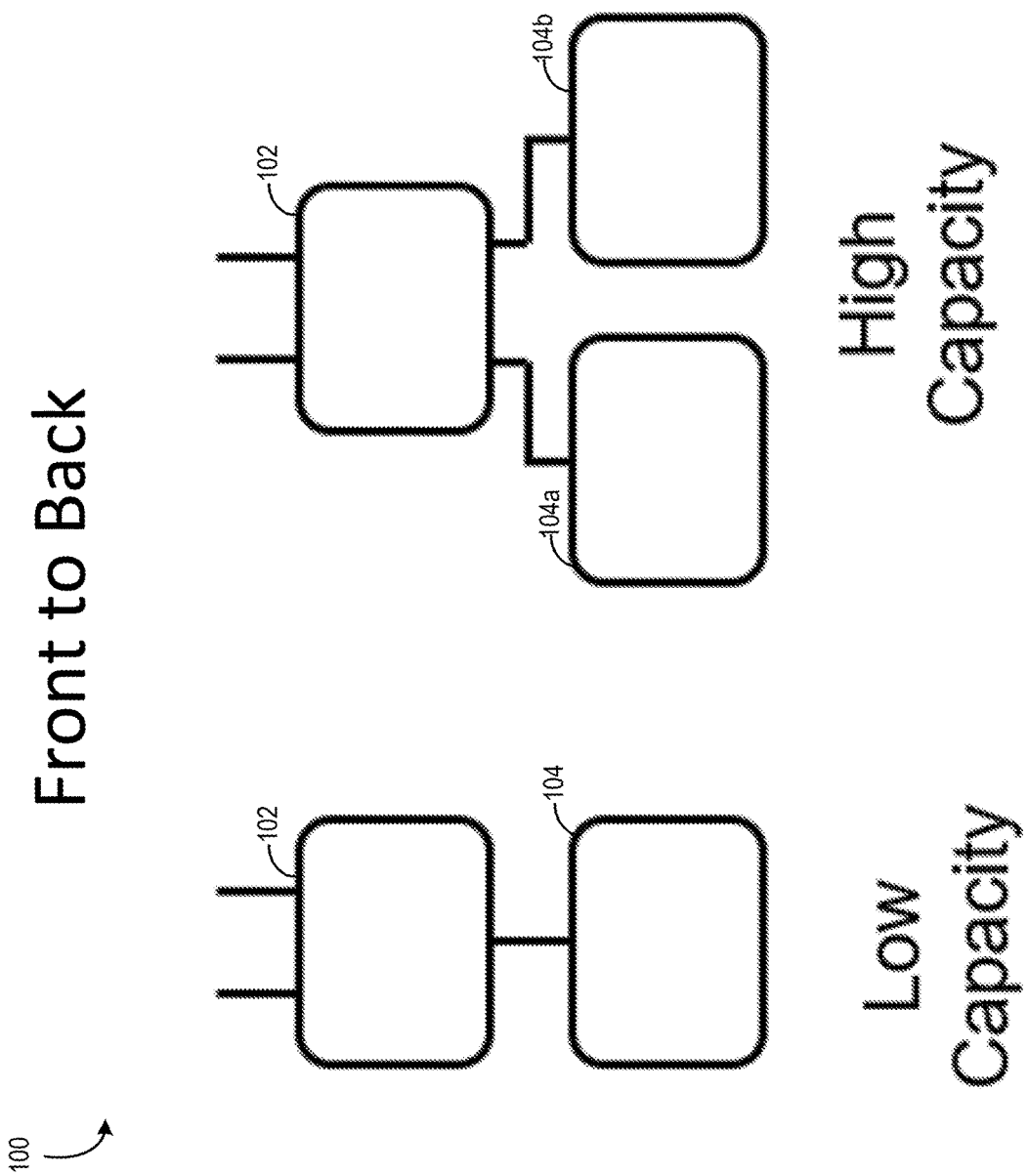
FIG. 1 is a block diagram depicting an example front-to-back configuration supporting a low-capacity solution and a front-to-back configuration supporting a high-capacity solution, in accordance with some conventional embodiments.

The following acronyms are used throughout the present disclosure:

DRAM Dynamic Random-Access Memory
ESDI Enhanced Small Disk Interface
FeRAM Ferro-Electric RAM
FTL Flash Translation Layer
LBA Logical Block Address
LUN Logical Unit
MRAM Magnetic Random-Access Memory
NAND Not-AND
NVMe Non-Volatile Memory Express
PCI Peripheral Component Interconnection
PCM Phase Change Memory
RAM Random Access Memory
SATA Serial-Advanced Technology Attachment
SCSI Small Component Small Interface
SRAM Static Random-Access Memory
SSD Solid State Drive
USB Universal Serial bus Conventional multi-chip arrangement of storage devices (e.g. SSDs) comprising NAND-type Flash memory devices comes in various configurations. For example, FIG. 1 is a block diagram depicting an example so-called front-to-back configuration supporting a low-capacity solution and a front-to-back configuration supporting a high-capacity solution, in accordance with some conventional embodiments. A front-to-back configuration is where a multi-port front-end chip or controller supports the host computer facing interfaces and one or more back-end chips or controllers support the NAND-type Flash operations. As shown in FIG. 1, a front-to-back configuration supporting a low-capacity solution has a multi-port front-end chip (e.g., controller 102) that drives only one back-end chip (e.g., controller 104), while a front-to-back configuration supporting a high-capacity solution has a multi-port front-end chip (e.g., controller 102) that drives multiple back-end chips (e.g., controller 104a, controller 104b) in parallel. In some embodiments, controller 104, controller 104a, and/or controller 104b may have equivalent functionality and/or be the same type of controller.

The front-to-back configuration has advantages, in that this type of multi-chip arrangement may be scaled by increasing the number of back-end (BE) chips. The arrangement is also conceptually simpler, as is the coherency between the chips since all the memory accesses of the back-end chips are controlled through the single front-end chip.

There are drawbacks with the front-to-back configuration. For one, all traffic (e.g., data, command) must cross the chip-to-chip interface from front-end to back end. The minimum configuration possible also requires at least two chips, where the most common configuration uses up to three chips. Lastly, the front-end chip must be capable of the highest performance configuration since it carries all the command and data traffic between the host computers and the memory devices.

Figure 2:
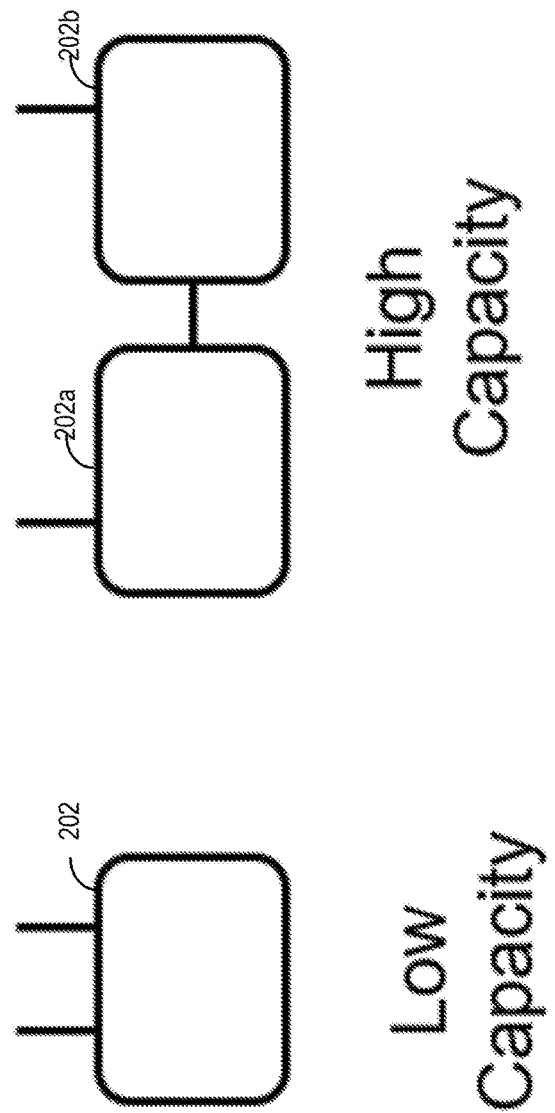
FIG. 2 is a block diagram depicting an example side-by-side configuration supporting a low-capacity solution and a side-by-side configuration supporting a high-capacity solution, in accordance with some conventional embodiments.

Another type of multi-chip arrangement is the side-to-side configuration, where each chip or controller supports both the front-end operations (e.g., interface operations to the host computers) and the back-end operations (e.g., NAND-Flash operations). For example, FIG. 2 is a block diagram depicting an example side-to-side configuration supporting a low-capacity solution and a side-to-side configuration supporting a high-capacity solution, in accordance with some conventional embodiments.

A side-by-side configuration supporting a low-capacity solution requires only one chip (e.g., controller 202a). Conversely, a side-by-side configuration supporting a high-capacity solution has two chips (e.g., controllers 202a, controller 202b), where each chip is connected to one another in a side-by-side configuration. In some embodiments, controller 202, controller 202a, and/or controller 202b may have equivalent functionality and/or be the same type of controller.

The side-by-side configuration has advantages over the front-to-back configuration. As discussed above, a front-to-back configuration, and shown in FIG. 1, requires a minimum of two chips (e.g., controller 102 and controller 104), while a side-by-side configuration, as shown in FIG. 2, only requires a minimum 1 chip. This reduction in chips provides significant cost savings over other configurations. Additionally, only half of the traffic must cross between the chips in a side-by-side configuration. The bandwidth also spreads across the chips.

The side-by-side configuration allows for more than one chip to simultaneously function as the "primary" chip. For example, the controller 202a can be designated (e.g., assigned, allocated, configured, initialized, etc.) as a "primary" (e.g., controlling, directing, governing, etc.) chip, while controller 202b is designated as a "secondary" (e.g., controlled, directed, governed, etc.) chip. For this reason, the side-by-side configuration does have some significant drawbacks that complicate its implementation. For one, a side-by-side configuration (which includes two chips) suffers from Command Coherency, which occurs when one chip attempts to access (e.g., read, write) the same memory range (e.g., namespace or NAND flash memory locations) that the other chip is attempting to access.

A Deadly Embrace can also occur in a side-by-side configuration. For example, the ranges need to be acquired on both chips to ensure read/write atomicity. As both chips can be requesting the same ranges at the same time and the chip-to-chip interface introduces delay to the other side (e.g., a controller chip), it is theoretically possible that each chip acquires half the range that the other needs—a so-called Deadly Embrace.

Thus, a mechanism is needed for overcoming the problems introduced by a side-by-side configuration in multi-chip arrangement of NAND-type Flash memory devices.

Accordingly, the systems and methods discussed herein provide a mechanism for maintaining multi-chip coherence when using a side-by-side parallel multi-port operation.

In general, as discussed in greater below, one chip in the side-by-side configuration may be configured into a first mode that causes the chip to function as the "primary" chip, and the other chip may be configured into a second mode that causes the other chip to function as the "secondary" chip. When the secondary chip wants to access a memory range location on the secondary chip, it sends a range request to the primary chip. The primary chip is configured to serialize (e.g., interleave, etc.) the range requests that it receives from the secondary chip with any other range requests that are issued by the primary chip, in order to generate a serialized (e.g., interleaved, etc.) request or requests, and send the serialized requests to the backend component (e.g., supporting back-end operations) of the primary chip and to the secondary chip. By serializing the range requests into a serialized request, each chip (e.g., the primary chip and the secondary chip) receive the same sequence of requests; thereby resolving the coherency problems (e.g., Deadly Embrace, etc.) that occur with the conventional side-by-side configuration. A similar operation is performed to release ranges, however other requests (e.g., execution operations, coherence completion operations) can go directly point to point.

Figure 3A:
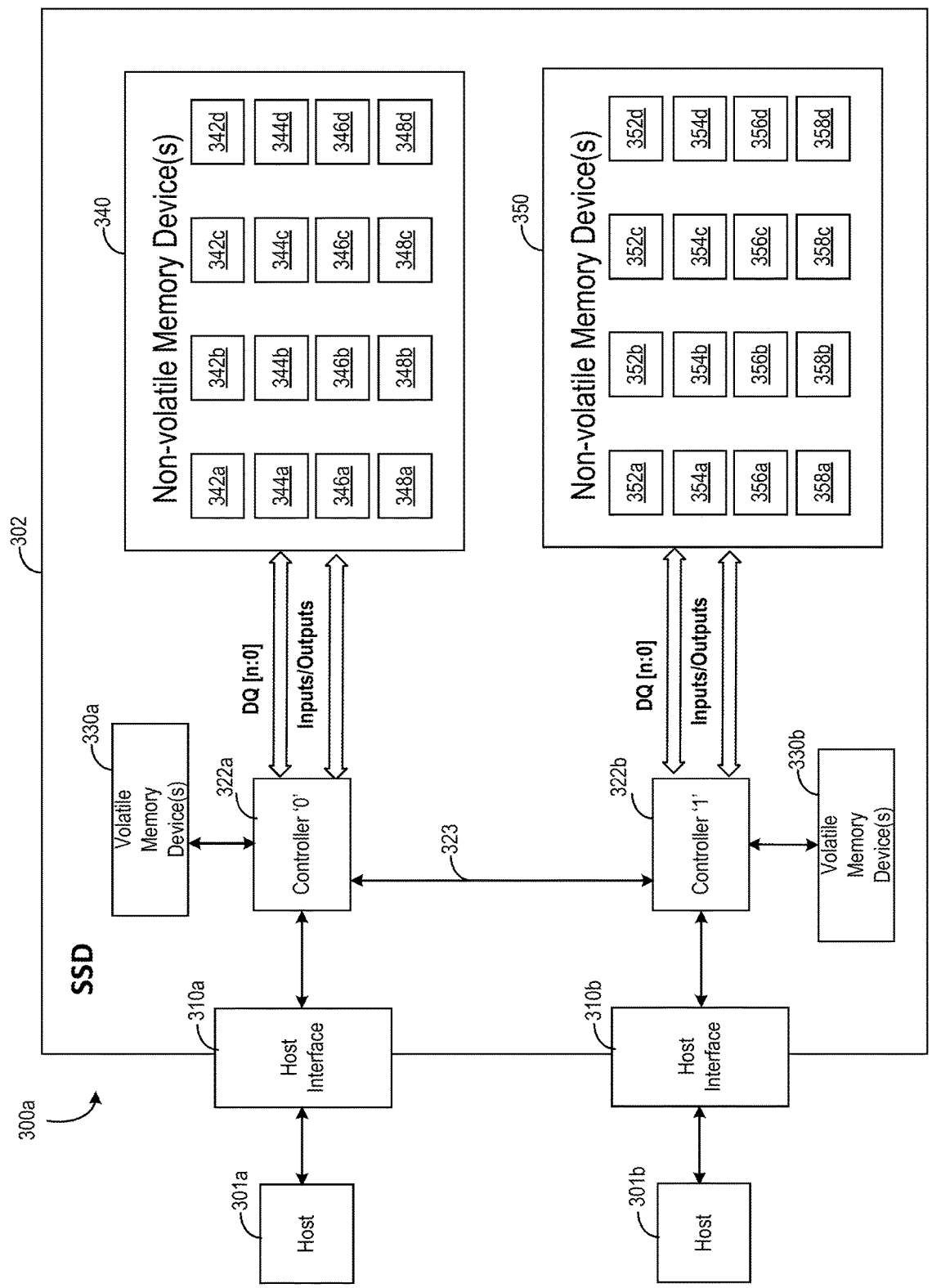
FIG. 3A depicts an example SSD system in which techniques disclosed herein may be implemented, in accordance with some embodiments of the present disclosure.

FIG. 3A depicts an example SSD system in which techniques disclosed herein may be implemented, in accordance with some embodiments of the present disclosure. As shown in FIG. 3A, the system 300a includes a host 301a, a host 301b, and an SSD 302. The SSD 302 includes a host interface 310a and a host interface 310b. The SSD 302 includes a controller 322a (sometimes referred to as, "Controller 0" or "chip 0") and a controller 322b (sometimes referred to as, "Controller 1" or "chip 1").

The controller 322a includes one or more input/output ports and/or buses for interfacing the controller 322a with the host interfaces 310a. The controller 322b includes one or more input/output ports and/or buses for interfacing the controller 322b with the host interfaces 310b. In some embodiments, the host interface 310a and the host interface 310b may be a single host interface, such that the controller 322a and the controller 322b each interface to the single host interface.

The SSD 302 includes a volatile memory device 330a and a volatile memory device 330b. The SSD 302 includes a non-volatile memory device 340 and a non-volatile memory device 350. In some embodiments, the volatile memory devices 330a, 330b may each include and/or correspond to a plurality of volatile memory devices. In some embodiments, the non-volatile memory 340, 350 may each include and/or correspond to a plurality of non-volatile memory. The non-volatile memory 340 includes an array of non-volatile memory dies 342a-342d, 344a-344d, 346a-346d, and 348a-348d (sometimes collectively referred to as, "LUNs"). The non-volatile memory 350 includes an array of non-volatile memory dies 352a-352d, 354a-354d, 356a-356d, and 358a-358d.

The controller 322a is in communication with and operatively coupled to the host 301a through the host interface 310a. The controller 322b is in communication with and operatively coupled to the host 301b through the host interface 310b.

The hosts 301a, 301b can each be one or more host devices and/or host applications. The hosts 301a, 303B can include any suitable device such as but not limited to, a computing device and/or a storage appliance. In some examples, the host 301a, 301b can each be a user device operated by a user. In some implementations, the hosts 301a, 301b and/or the SSD 302 reside in a datacenter (not shown). The datacenter includes a plurality of platforms, each of which can support a plurality of hosts (such as but not limited to, the hosts 301a, 301b) and/or SSD devices (such as but not limited to, the SSD 302).

The host devices 301a, 301b can each access the SSD 302, for example, by sending write and read commands to the SSD 302 through their respective host interface (e.g., host interface 310a, host interface 310b). Examples of a host interface include but are not limited to, a Universal Serial Bus (USB) interface, a Serial-Advanced Technology Attachment (SATA) interface, an Enhanced Small Disk Interface (ESDI), a Small Component Small Interface (SCSI), a Peripheral Component Interconnection (PCI) interface, an express Serial Attached SCSI (SAS), an Integrated Drive Electronics (IDE) interface, and/or a Non-Volatile Memory Express (NVMe) interface. In some embodiments a host interface may be a network interface and the host (e.g., host 301a, host 301b) connected to the host interface via a networking fabric (not shown for clarity) which may comprise multiple network routers, network switches and suchlike. Examples of a host interface which is a network interface include, but is not limited to, Ethernet, InfiniBand, OmniPath and Fiber Channel (FC).

The volatile memory device 330a and the non-volatile memory 340 are in communication with the controller 322a. As shown in FIG. 3A, the controller 322 is in communication with the non-volatile memory 340 via a "first" bidirectional multi-bit data bus (shown in FIG. 3A as, "DQ [n:0]") that is configured to carry data, address information, and/or command information. In some embodiments, 'n' may be any integer including, for example, 2, 4, 8, 16, 32, 64, or 128.

The volatile memory device 330b and the non-volatile memory 350 are in communication with the controller 322b. As shown in FIG. 3A, the controller 322b is in communication with the non-volatile memory 350 via a "second" bidirectional multi-bit data bus (shown in FIG. 3A as, "DQ [n:0]") that is configured to carry data, address information, and/or command information. In some embodiments, 'n' may be any integer including, for example, 2, 4, 8, 16, 32, 64, or 128.

While the NAND flash memory devices are described as examples of the non-volatile memory 340, 350 other examples of non-volatile memory technologies for implementing the non-volatile memory storage 340, 350 include but are not limited to, Magnetic Random Access Memory (MRAM), Phase Change Memory (PCM), Ferro-Electric RAM (FeRAM), Resistive RAM (ReRAM), or the like.

In some embodiments, a volatile memory device (e.g., volatile memory device 330a, volatile memory device 330b) includes a volatile memory RAM buffer. In some embodiments, volatile memory device may be wholly, or in part, contained within a controller (e.g., controller 322a, controller 322b). A volatile memory device can be a single device of a unitary type or multiple devices of different types capable of providing a volatile memory buffer for the SSD 302. Example of the volatile memory technologies for implementing a volatile memory storage (e.g., volatile memory device 330a, volatile memory device 330b) include, but are not limited to, static random-access memory (SRAM) and dynamic random-access memory (DRAM), or the like.

A controller (e.g., controller 322a, controller 322b) can combine raw data storage in non-volatile memory dies (e.g., non-volatile memory dies 342a-342d, 344a-344d, 346a-346d, and 348a-348d) such that those non-volatile memory dies function like a single storage. A controller can include microcontrollers, buffers, error correction functionality, flash translation layer (FTL), flash interface layer (FTL), flash controllers, flash management layer software, address mapping table, and firmware for implementing such functions as further described herein. In some arrangements, the software/firmware can be stored in the non-volatile memory 340 or in any other suitable computer readable storage medium.

A controller (e.g., controller 322a, controller 322b) may include suitable processing and memory capabilities for executing functions described herein, among other functions. For example, the controller 322a may include one or more processors (e.g., central processing units (CPUs)) for implementing the various functions of the controller 302a. As described, the controller 322a manages various features for the non-volatile memory dies 342a-342d, 344a-344d, 346a-346d, and 348a-348d; and the controller 322b manages various features for the non-volatile memory dies 352a-352d, 354a-354d, 356a-356d, and 358a-358d. Example features of a non-volatile memory that a controller many manage include Input/output (I/O) handling, reading, writing, erasing, monitoring, logging, error handling, garbage collection, wear leveling, logical to physical (L2P) address mapping, and the like. Thus, the controller 322a provides visibility to the non-volatile memory 340 and FTLs associated thereof, and the controller 322b provides visibility to the non-volatile memory 350 and FTLs associated thereof.

Each of the controllers 322a, 322b can perform logic-to-physical (L2P) operations based on an L2P table. For example, the controller 322a can translate a Logical Block Address (LBA) (e.g., an address provided by the host using a block storage protocol such as NVM Express (NVMe) or serial ATA (SATA) into a physical address (e.g., the reference to a location within a non-volatile memory die), thus resolving the physical address corresponding to the LBA. Responsive to receiving a write or read command (containing a LBA therein) from the host device, the controller 322a can look up the physical address corresponding to the LBA in order to write to or read from the physical address.

Figure 3B:
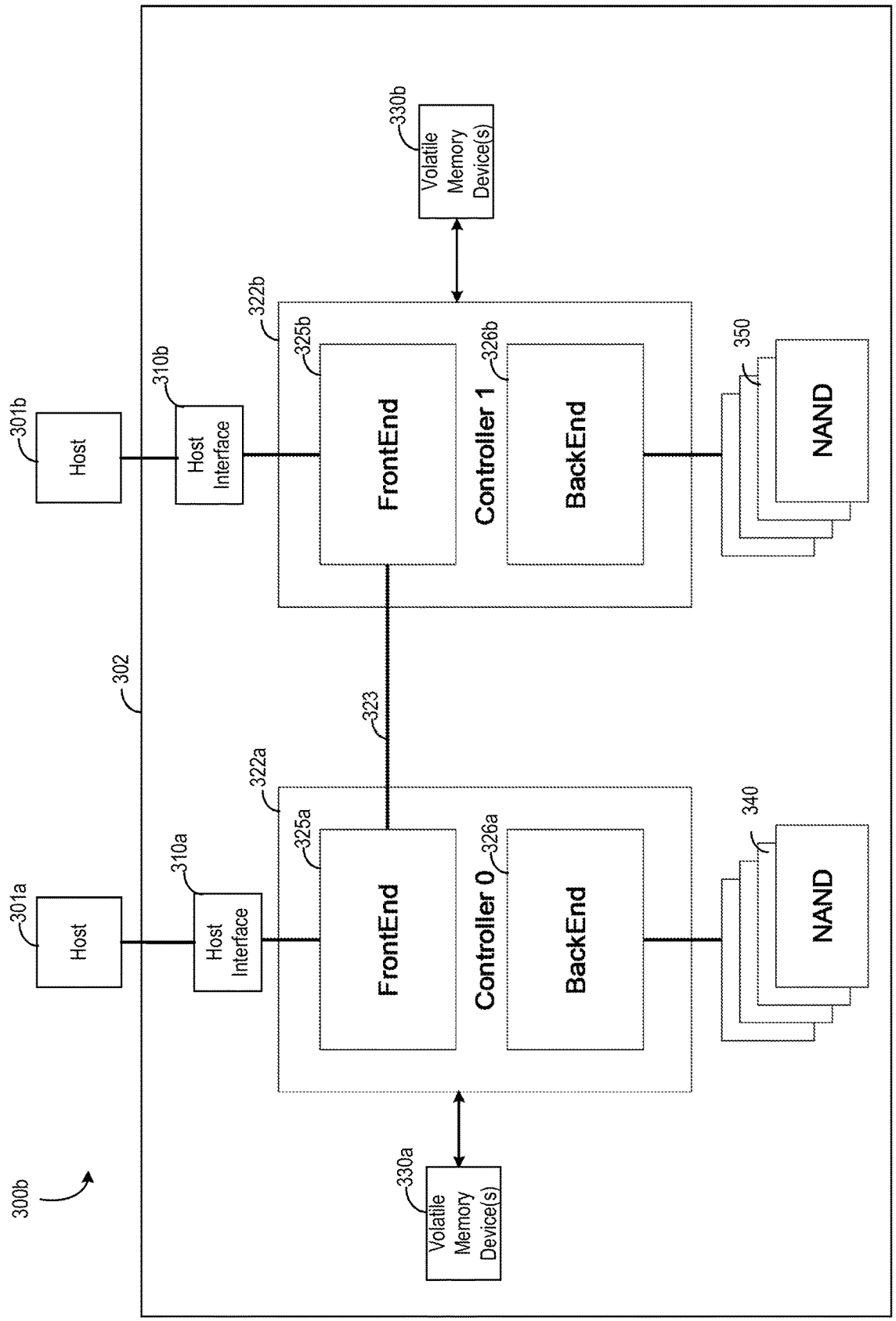
FIG. 3B depicts a block diagram of an example SSD system, in accordance with some embodiments of the present disclosure.

FIG. 3B depicts a block diagram of an example SSD system, in accordance with some embodiments of the present disclosure. The system 300b includes SSD 302, host 301a, and host 301b. The SSD 302 includes the controller 322a and the controller 322b. The controller 322a includes a frontend chip 325a and a backend chip 326a, and the controller 322b includes a frontend chip 325b and a backend chip 326b. In some embodiments, the frontend chip 325a and the frontend chip 325b may correspond to the same type of frontend chip, in that they each have similar and/or identical functionality. In some embodiments, backend chip 326a and backend chip 326b may correspond to the same type of backend chip, in that they each have similar and/or identical functionality.

The host 301a is in communication with and operatively coupled to the host interface 310a, which is in communication with and operatively coupled to the frontend chip 325a. The host 301b is in communication with and operatively coupled to the host interface 310b, which is in communication with and operatively coupled to the frontend chip 325b. The frontend chip 325a and frontend chip 325b are in communication with and operatively coupled to one another via the cross chip interface 323, as discussed herein.

The SSD 302 includes one or more non-volatile memory 340 (shown in FIG. 3B as, "NAND 340") and one or more non-volatile memory 350 (shown in FIG. 3B as, "NAND 350"). The backend chip 326a is in communication with and operatively coupled to the one or more non-volatile memory 340, and in communication with and operatively coupled to the one or more non-volatile memory 350.

The controller 322a is in communication with and operatively coupled to one or more volatile memory devices 330a. The controller 322b is in communication with and operatively coupled to one or more volatile memory devices 330b.

Figure 3C:
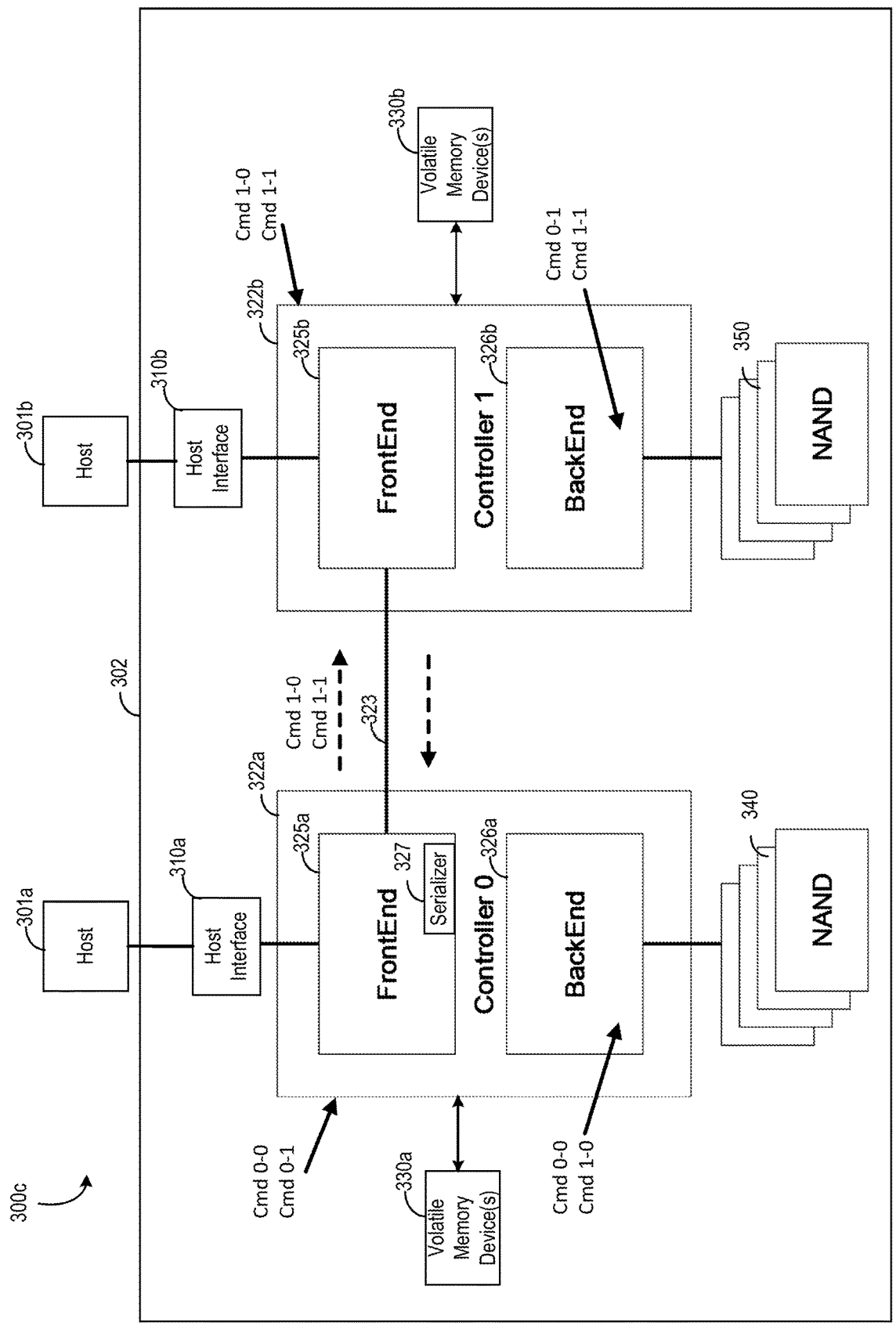
FIG. 3C depicts a block diagram of an example SSD system, in accordance with some embodiments of the present disclosure.

FIG. 3C depicts a block diagram of an example SSD system, in accordance with some embodiments of the present disclosure. The system 300C includes the SSD 302, the host 301a, and the host 301b. The SSD 302 includes the controller 322a and the controller 322b. The controller 322a includes a frontend chip 325a and a backend chip 326a, and the controller 322b includes a frontend chip 325b and a backend chip 326b.

The host 301a is in communication with and operatively coupled to the host interface 310a, which is in communication with and operatively coupled to the frontend chip 325a. The host 301b is in communication with and operatively coupled to the host interface 310b, which is in communication with and operatively coupled to the frontend chip 325b. The frontend chip 325a and frontend chip 325b are in communication with and operatively coupled to one another via the cross chip interface 323, as discussed herein.

The SSD 302 includes one or more non-volatile memory 340 (shown in FIG. 3C as, "NAND 340") and one or more non-volatile memory 350 (shown in FIG. 3C as, "NAND 350"). The backend chip 326a is in communication with and operatively coupled to the one or more non-volatile memory 340, and in communication with and operatively coupled to the one or more non-volatile memory 350.

The controller 322a is in communication with and operatively coupled to one or more volatile memory devices 330a. The controller 322b is in communication with and operatively coupled to one or more volatile memory devices 330b.

As shown in FIG. 3C, the controller 322a and the controller 322b are positioned in a side-by-side configuration with cross chip interface 323 between them.

The controller 322a includes a front-end chip 325a for supporting its NAND interfaces and the controller 322b includes a front-end chip 325b for supporting its NAND interfaces. The front-end chip 325a of the controller 322a includes a serializer 327a for supporting the serialization of one or more command range requests, as discussed herein.

The controller 322a includes a back-end chip 326a for supporting its NAND Flash operations and the controller 322b includes a back-end chip 326b for supporting its NAND Flash operations.

The controller 322a and/or controller 322b may include an area or quantity of non-volatile memory (e.g., non-volatile memory device 340) referred to as a "namespace" that be formatted into a collection of logical blocks. In some embodiments, each namespace contains "n" number of logical blocks with logical block addresses from 0 to (n−1). In some embodiments, a namespace ID is an identifier used by a controller (e.g., controller 322a and/or controller 322b) to provide access to a namespace. In some embodiments, a command range request may include a namespace ID.

The serializer 327 of controller 322a may serialize (e.g., interleave) the namespace for controller 322a and/or controller 322b at fixed logical intervals, for example every 128 Host Sectors (or 64 k bytes if host sector size is 512 bytes).

The back-end chip (e.g., back-end chip 326a, back-end chip 326b), in some embodiments, may be configured to maintain (e.g., store, preserve, record, etc.) a command range overlap as viewed from each chip. That is, in the side-by-side configuration of FIG. 3C (and shown in FIG. 2), the controller 322a may maintain a command range overlap as viewed from the controller 322a and the controller 322b.

Figure 3D:
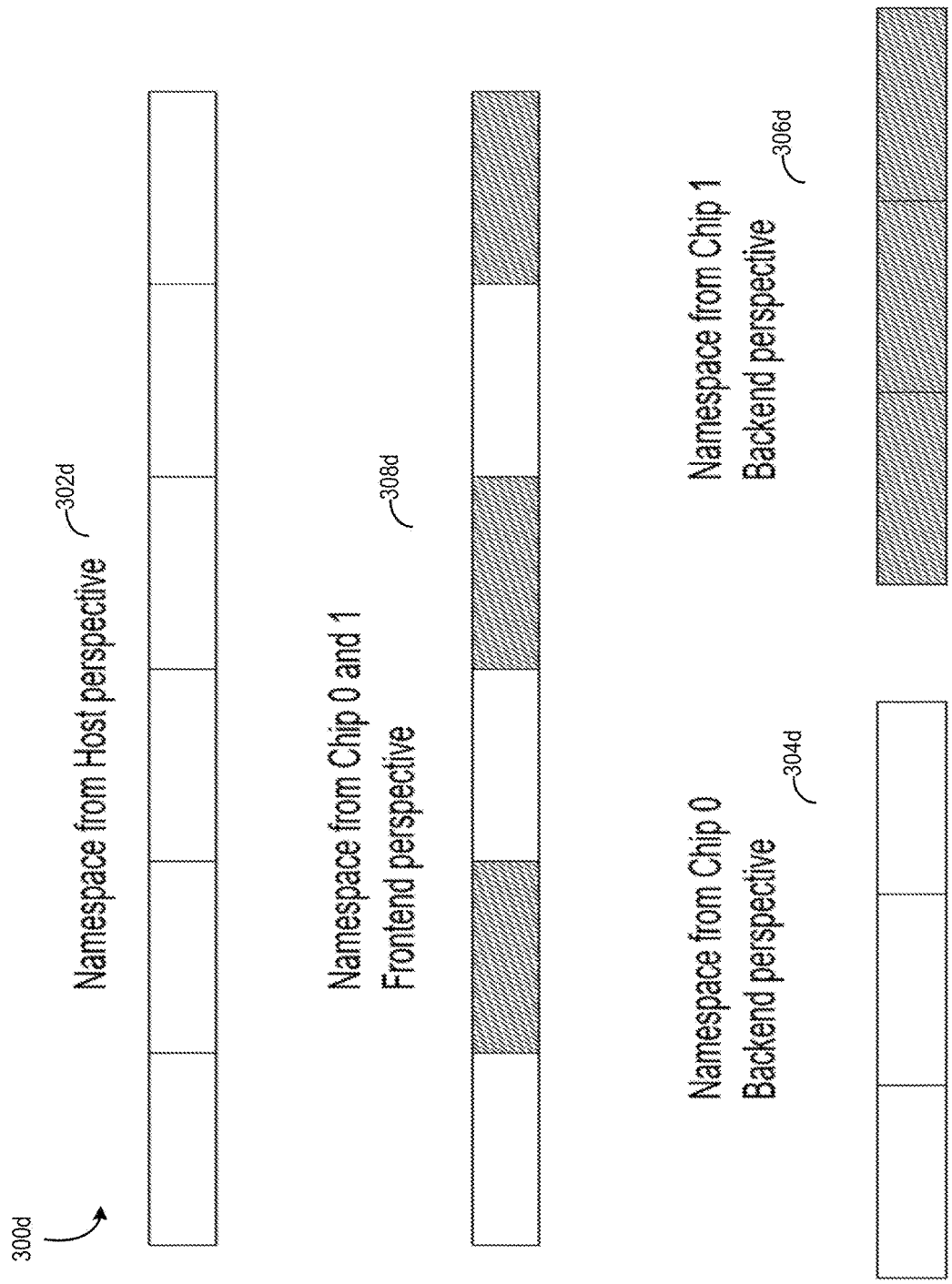
FIG. 3D depicts example namespace perspectives from a host, a front-end chip, and a back-end chip, in accordance with some embodiments of the present disclosure.

For example, FIG. 3D depicts example namespace perspectives from a host, a front-end chip, and a back-end chip, in accordance with some embodiments of the present disclosure. Namespace 302d shows a namespace from the perspective of a host (e.g., host 301a, host 301b). Namespace 304d shows a namespace from the perspective of the back-end chip 326a of controller 322a. Namespace 306d shows a namespace from the perspective of the back-end chip 326b of controller 322b. Namespace 308d shows the namespace of controller 322a interleaved with the namespace of controller 322b, as viewed from the perspective of the front-end chip (e.g., front-end 325a, front-end 325b).

Referring back to FIG. 3C, a back-end chip (e.g., back-end chip 326a, back-end chip 326b), in some embodiments, may maintain a command range overlap via an Augmented Red-Black Tree Structure of command ranges.

Ranges, in some embodiments, may be used to ensure that read requests (sometimes referred to as, "command range request") versus write requests (sometimes referred to as, "command range request"), and write request versus write request do not get executed at the same time for overlap cases.

A front-end chip, in some embodiments, may be configured to issue a command range request. For example, a front-end chip (e.g., front-end chip 325a, front-end chip 325b) of a controller (e.g., controller 322a, controller 322b) may be configured to issue a command range request to read a memory range. As another example, a front-end chip (e.g., front-end chip 325a, front-end chip 325b) of a controller (e.g., controller 322a, controller 322b) may be configured to issue a command range request to write to a memory range.

One or more hosts (e.g., host 301a, host 301b) may be configured to send a first command message to the controller 322a to configure the controller 322a as the "primary" chip (as discussed herein), and a second command message to the controller 322b to configure the controller 322b as the "secondary" chip (as discussed herein). In some embodiments, the host may preconfigure (e.g., initialize, program, etc.) the controller 322a as the primary chip and preconfigure the controller 322b as the secondary chip, such that at power-up (e.g., boot-up), the controller 322a configures itself as the primary chip based on its pre-configuration and the controller 322b configures itself as the secondary chip based on its pre-configuration. In some embodiments, a pre-configuration may include reading a file and/or register values from a memory location.

A controller may be configured to generate command range requests (e.g., read, write) to access a memory range. For example, the controller 322a may generate a command range request to read and/or write to a memory range on controller 322a and/or controller 322b. As another example, the controller 322b may generate a command range request to read and/or write to a memory range on controller 322a and/or controller 322b. In some embodiments, controller 322a and controller 322b may generate command request to access the same memory range, such that if the two requests were simultaneously executed by controller 322a and/or controller 322b, then a Deadly Embrace condition (as discussed herein) would occur.

A controller that is configured as the secondary chip, in some embodiments, may want to access one or more memory ranges on a controller that is configured as the primary chip. For example, the controller 322b, in some embodiments, may want to access one or more memory ranges on the controller 322a. To do so, the controller 322b may be configured to generate and issue (e.g., send, transmit, etc.) one or more command range requests to the controller 322a via the cross chip interface 323 in FIG. 3C, where the one or more command range requests each indicate a request to access a memory range on the controller 322a.

A controller that is configured as the secondary chip, in some embodiments, may want to access one or more memory ranges on itself. For example, the controller 322b, in some embodiments, may want to access one or more memory ranges on the controller 322b. To do so, the controller 322b may be configured to generate and issue one or more command range requests to the controller 322a via the cross chip interface 323, where the one or more command range requests each indicate a request to access a memory range on the controller 322b.

A controller that is configured as the secondary chip, in some embodiments, may want to access one or more memory ranges that are located on itself and on a controller that is configured as the primary chip. For example, the controller 322b, in some embodiments, may want to access memory ranges from both the controller 322a and the controller 322b. To do so, the controller 322b may be configured to generate and issue a plurality of command range requests to the controller 322a via the cross chip interface 323, where the plurality of command range requests indicate a request to access a memory range on the controller 322a and the controller 322b.

The controller 322a that is configured as the primary chip, in some embodiments, may be configured to receive the one or more command range requests from the controller 322b.

In response to receiving the request, the controller 322a (using serializer 327) may be configured to serialize (e.g., interleave, etc.) the one or more command range requests that it receives from the controller 322b with any other command range requests that are issued by the controller 322a, in order to generate a serialized (e.g., interleaved, etc.) command range request.

In some embodiments, a request may correspond to a plurality of operations. For example, a request to READ from a memory range may include a beginning operation, one or more intermediate operations, and an end operation (sometimes referred to as, a "command end control"). In some embodiments, a request may correspond to one or more coherence management operations, one or more execution operations (including data transfer), and one or more coherence completion operations.

In some embodiments, the remainder (e.g., execution operations and/or coherence completion operations) of the command does not require synchronization and goes directly to intended chip. In some embodiments, the controller 322a may be configured to extract the beginning operations (e.g., one or more coherence management operations) from the one or more command range requests associated with controller 322a and the one or more command range requests associated with controller 322b, and serialize the extracted beginning operations to generate the serialized request.

The controller 322a, in some embodiments, may be configured to allow the controller 322b to process the other operations (i.e., the non-beginning operations) of the second plurality of operations without having to send a request associated with the other operations to the controller 322a. In some embodiments, the command end control is also similarly routed through one chip (e.g., controller 322a, controller 322b) for the same reason.

In some embodiments, if ranges are ready to process, a response is sent and the front-end counts the responses. In some embodiments, controller 322a may be configured to determine a synchronization (e.g., an available and/or released memory range) between controller 322a and the controller 322b.

The controller 322b, in some embodiments, may be configured to send the serialized command range request to the back-end circuit of the controller 322b and/or to the back-end circuit of the controller 322a. The controller 322b, in some embodiments, may be configured to send the serialized command range request to the back-end circuit of the controller 322b and/or to the back-end circuit of the controller 322a responsive to determining a synchronization between the controller 322a and the controller 322b.

The controller 322b, in some embodiments, may be configured to send the serialized command range request to the back-end circuit of the controller 322b and to the back-end circuit of the controller 322a in a "fanned-out" or "broadcast" transmission, such that both of the back-end circuits of the controllers (e.g., controller 322a and controller 322b) receive the same series of command range requests. In other words, the command range requests are routed through one chip (e.g., controller 322a) to ensure that command range requests are serialized and that the back-end circuits of both chips (e.g., controller 322a and controller 322b) receive command range requests that are in same order to ensure coherent ranges between chips.

Figure 4:
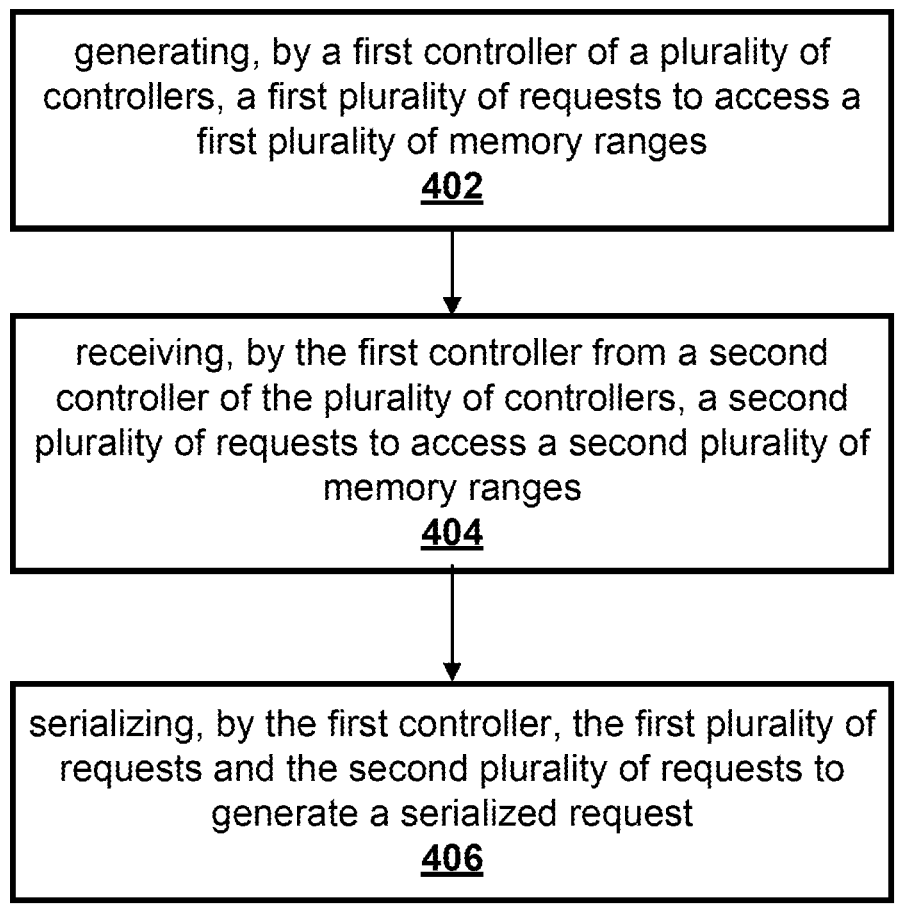
FIG. 4 is a flow diagram depicting a method for maintaining multi-chip coherence when using a side-by-side parallel multi-port operation, in accordance with some embodiments of the present disclosure.

FIG. 4 is a flow diagram depicting a method for maintaining multi-chip coherence when using a side-by-side parallel multi-port operation, in accordance with some embodiments of the present disclosure. Additional, fewer, or different operations may be performed in the method depending on the particular embodiment. In some embodiments, some or all operations of method 400 may be performed by an SSD (e.g., SSD 202a, 2020b in FIG. 2, SSD 302 in FIGS. 3A-3C) or one or more components of the SSD, such as controllers 202a and/or 202b in FIG. 2, controller 322a in FIGS. 3A-3C, and/or controller 322b in FIGS. 3A-3C. Each operation may be re-ordered, added, removed, or repeated.

As shown, the method 400 includes, in some embodiments, the operation 402 of generating, by a first controller of a plurality of controllers, a first plurality of requests to access a first plurality of memory ranges. The method 400 includes, in some embodiments, the operation 404 of receiving, by the first controller from a second controller of the plurality of controllers, a second plurality of requests to access a second plurality of memory ranges. The method 400 includes, in some embodiments, the operation 406 of serializing, by the first controller, the first plurality of requests and the second plurality of requests to generate a serialized request.

Figure 5:
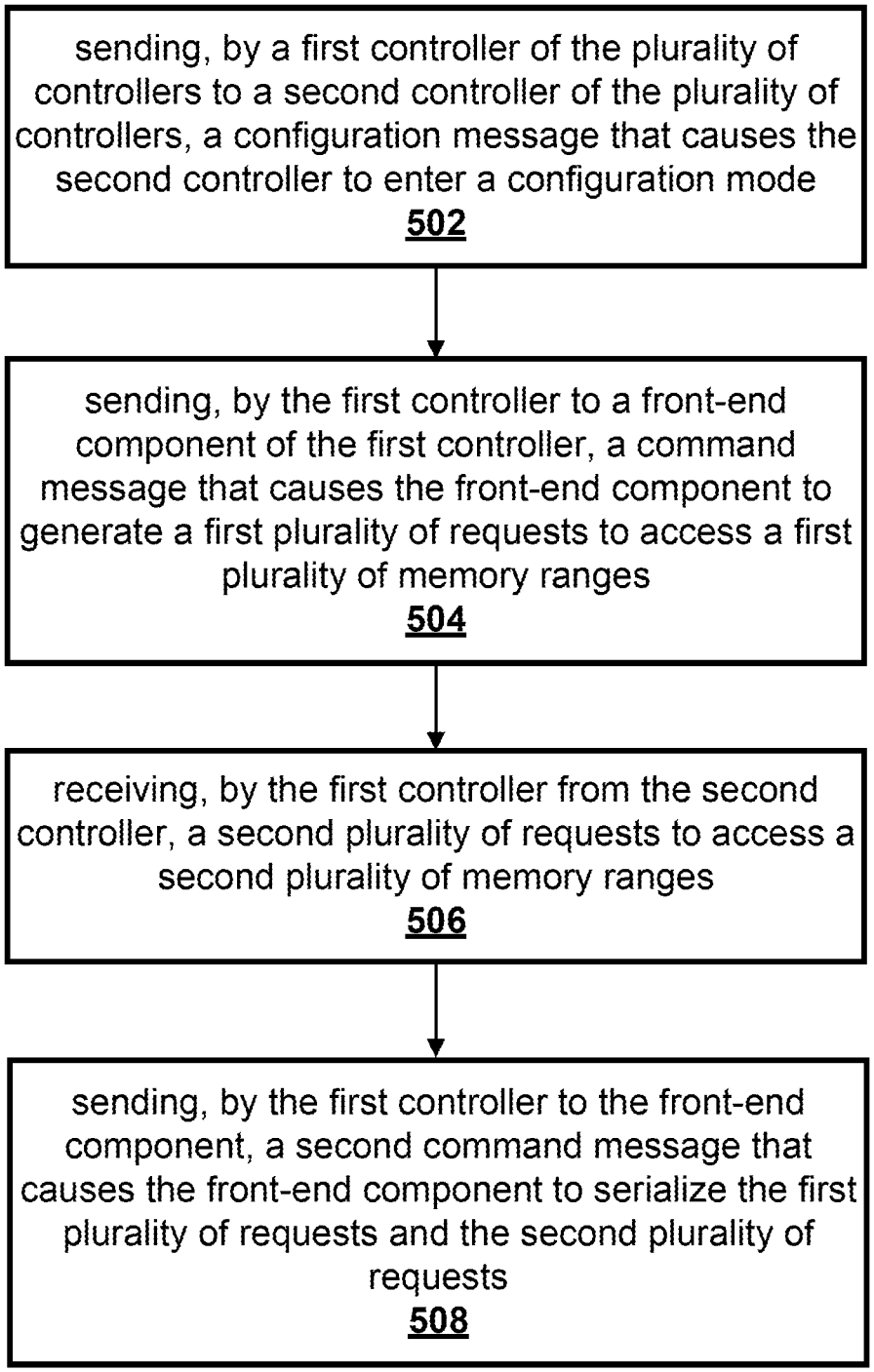
FIG. 5 is a flow diagram depicting a method for maintaining multi-chip coherence when using a side-by-side parallel multi-port operation, in accordance with some embodiments of the present disclosure.

FIG. 5 is a flow diagram depicting a method for maintaining multi-chip coherence when using a side-by-side parallel multi-port operation, in accordance with some embodiments of the present disclosure. Additional, fewer, or different operations may be performed in the method depending on the particular embodiment. In some embodiments, some or all operations of method 500 may be performed by an SSD (e.g., SSD 202a, 2020b in FIG. 2, SSD 302 in FIGS. 3A-3C) or one or more components of the SSD, such as controllers 202a and/or 202b in FIG. 2, controller 322a in FIGS. 3A-3C, and/or controller 322b in FIGS. 3A-3C. Each operation may be re-ordered, added, removed, or repeated.

As shown, the method 500 includes, in some embodiments, the operation 502 of sending, by a first controller of the plurality of controllers to a second controller of the plurality of controllers, a configuration message that causes the second controller to enter a configuration mode. The method 500 includes, in some embodiments, the operation 504 of sending, by the first controller to a front-end component of the first controller, a command message that causes the front-end component to generate a first plurality of requests to access a first plurality of memory ranges. The method 500 includes, in some embodiments, the operation 506 of receiving, by the first controller from the second controller, a second plurality of requests to access a second plurality of memory ranges. The method 500 includes, in some embodiments, the operation 508 of sending, by the first controller to the front-end component, a second command message that causes the front-end component to serialize the first plurality of requests and the second plurality of requests.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or serialized with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for maintaining coherence for memory storage devices comprising a plurality of controllers in a side-by-side configuration, comprising,
generating, by a first controller of the plurality of controllers, a first plurality of requests to access a first plurality of memory ranges;
receiving, by the first controller from a second controller of the plurality of controllers, a second plurality of requests to access a second plurality of memory ranges; and
serializing, by the first controller, the first plurality of requests and the second plurality of requests to generate a serialized request.

2. The method of claim 1, further comprising:
determining, by the first controller, a synchronization between the first controller and the second controller.

3. The method of claim 2, further comprising:
sending, by the first controller, the serialized request to a back-end component of the first controller and to a back-end component of the second controller.

4. The method of claim 3, wherein the serialized request causes the back-end component of the first controller to process the serialized request responsive to receiving the serialized request, wherein the serialized request causes the back-end component of the second controller to process the serialized request responsive to receiving the serialized request.

5. The method of claim 1, wherein the first plurality of requests are associated with a plurality of generation times that are each indicative of when the first controller generated a respective request of the first plurality of requests, wherein the second plurality of requests are associated with a plurality of receiving times that are each indicative of when the first controller received a respective request of the second plurality of requests from the second controller, and further comprising:
interleaving, by the first controller, the first plurality of requests and the second plurality of requests according to the at least one of the plurality of receiving times or the plurality of generation times.

6. The method of claim 1, wherein a first memory range of the first plurality of memory ranges is associated with a non-volatile memory of the second controller.

7. The method of claim 1, wherein a second memory range of the second plurality of memory ranges corresponds to the first memory range of the first plurality of memory ranges.

8. The method of claim 1, further comprising:
preventing, by the first controller and prior to generating the serialized request, a back-end component of the first controller from processing the first plurality of requests.

9. The method of claim 1, wherein the second plurality of requests to access a second plurality of memory ranges comprises a plurality of command end controls.

10. The method of claim 1, wherein each request of the first plurality of requests corresponds to a first plurality of operations; wherein each request of the second plurality of requests corresponds to a second plurality of operations.

11. The method of claim 10, wherein serializing the first plurality of requests and the second plurality of requests comprises:

extracting, by the first controller, a beginning operation from each of the first plurality of operations to generate a plurality of beginning operations associated with the first plurality of operations;

extracting, by the first controller, a beginning operation from each of the second plurality of operations to generate a plurality of beginning operations associated with the second plurality of operations; and serializing, by the first controller, the plurality of beginning operations associated with the first plurality of operations and the plurality of beginning operations associated with the second plurality of operations to generate the serialized request.

12. The method of claim 1, further comprising:

allowing, by the first controller, the second controller to process the other operations of the second plurality of operations without sending a request to the first controller.

13. A storage device, comprising:

a first controller and a second controller in a side-by-side configuration, a memory, the first controller comprising:

a back-end component; and a front-end component configured to:
generate a first plurality of requests to access a first plurality of memory ranges of the memory;
receive, from the second controller, a second plurality of requests to access a second plurality of memory ranges of the memory; and
serialize the first plurality of requests and the second plurality of requests to generate a serialized request.

14. The storage device of claim 13, wherein the front-end component is further configured to:
determine a synchronization between the first controller and the second controller.

15. The storage device of claim 13, wherein the front-end component is further configured to:
send the serialized request to the back-end component of the first controller; and
send the serialized request to a back-end component of the second controller.

16. The storage device of claim 13, wherein the first plurality of requests are associated with a plurality of generation times that are each indicative of when the first controller generated a respective request of the first plurality of requests, wherein the second plurality of requests are associated with a plurality of receiving times that are each indicative of when the first controller received a respective request of the second plurality of requests from the second controller, and wherein the front-end component is further configured to:
interleave the first plurality of requests and the second plurality of requests according to the at least one of the plurality of receiving times or the plurality of generation times.

17. The storage device of claim 13, wherein a first memory range of the first plurality of memory ranges is associated with a non-volatile memory of the second controller.

18. The storage device of claim 13, wherein a second memory range of the second plurality of memory ranges corresponds to the first memory range of the first plurality of memory ranges.

19. The storage device of claim 13, wherein the front-end component is further configured to:
prevent, prior to generating the serialized request, the back-end component of the first controller from processing the first plurality of requests.

20. The storage device of claim 13, wherein the second plurality of requests to access a second plurality of memory ranges comprises a plurality of command end controls.

21. The storage device claim 13, wherein each request of the first plurality of requests corresponds to a first plurality of operations; wherein each request of the second plurality of requests corresponds to a second plurality of operations.

22. The storage device of claim 21, wherein the front-end component is further configured to:
extract a beginning operation from each of the first plurality of operations to generate a plurality of beginning operations associated with the first plurality of operations;
extract a beginning operation from each of the second plurality of operations to generate a plurality of beginning operations associated with the second plurality of operations; and
serialize the plurality of beginning operations associated with the first plurality of operations and the plurality of beginning operations associated with the second plurality of operations to generate the serialized request.

23. The storage device of claim 13, wherein the front-end component if further configured to:
allow the second controller to process the other operations of the second plurality of operations without sending a request to the first controller.

24. A method for maintaining coherence for memory storage devices comprising a plurality of controllers in a side-by-side configuration, comprising,
sending, by a first controller of the plurality of controllers to a second controller of the plurality of controllers, a configuration message that causes the second controller to enter a configuration mode;
sending, by the first controller to a front-end component of the first controller, a command message that causes the front-end component to generate a first plurality of requests to access a first plurality of memory ranges;
receiving, by the first controller from the second controller, a second plurality of requests to access a second plurality of memory ranges; and
sending, by the first controller to the front-end component, a second command message that causes the front-end component to serialize the first plurality of requests and the second plurality of requests.

* * * * *